United States Patent
Takeda et al.

(10) Patent No.: US 8,755,494 B2
(45) Date of Patent: *Jun. 17, 2014

(54) METHOD AND APPARATUS FOR VOICE INTERACTIVE MESSAGING

(71) Applicants: Kyoko Takeda, San Diego, CA (US); Theodore R. Booth, III, San Diego, CA (US); Jason Clement, San Diego, CA (US)

(72) Inventors: Kyoko Takeda, San Diego, CA (US); Theodore R. Booth, III, San Diego, CA (US); Jason Clement, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,247

(22) Filed: Dec. 11, 2012

(65) Prior Publication Data

US 2013/0136243 A1 May 30, 2013

Related U.S. Application Data

(63) Continuation of application No. 12/491,789, filed on Jun. 25, 2009, now Pat. No. 8,345,830, which is a continuation of application No. 10/916,745, filed on Aug. 11, 2004, now Pat. No. 7,570,746.

(60) Provisional application No. 60/554,755, filed on Mar. 18, 2004.

(51) Int. Cl.
*H04M 1/64* (2006.01)

(52) U.S. Cl.
USPC ............ 379/88.04; 379/88.25; 704/254

(58) Field of Classification Search
USPC .......... 379/88.01–88.04, 88.23, 88.24; 1/1; 709/206; 455/404.2; 704/254, 270.1, 704/275
See application file for complete search history.

(56) References Cited

U.S. PATENT DOCUMENTS

| 4,856,066 A | 8/1989 | Lemelson |
| 5,146,487 A | 9/1992 | Bergsman et al. |

(Continued)

FOREIGN PATENT DOCUMENTS

| EP | 1246086 | 10/2002 |
| EP | 1357728 | 10/2003 |

(Continued)

OTHER PUBLICATIONS

Advisory Action for U.S. Appl. No. 12/491,789 mailed Mar. 24, 2011.

(Continued)

*Primary Examiner* — MD S Elahee
(74) *Attorney, Agent, or Firm* — Fitch, Even, Tabin & Flannery LLP

(57) ABSTRACT

An audio indication of a message recipient is received from a user who desires that a message be sent to the message recipient. The audio indication is analyzed to determine the recipient and searching an electronic database for an account of the recipient. Information is retrieved from the electronic account. The retrieved information indicates at one or more modes of message delivery to the recipient. An audio guide for the user based is constructed upon the retrieved information. The audio guide includes one or more audio prompts that are entirely customizable and not based upon a predetermined pattern. The user is sequentially prompted with the audio prompts to select at least one of the modes of message delivery. The message is constructed and sent to the recipient according to the selected mode of message delivery.

12 Claims, 6 Drawing Sheets

(56) References Cited

U.S. PATENT DOCUMENTS

| | | | |
|---|---|---|---|
| 5,864,606 | A | 1/1999 | Hanson et al. |
| 6,075,844 | A | 6/2000 | Goldberg et al. |
| 6,385,586 | B1 | 5/2002 | Dietz |
| 6,446,042 | B1 | 9/2002 | Detlef et al. |
| 6,449,496 | B1 | 9/2002 | Beith et al. |
| 6,477,240 | B1 | 11/2002 | Lim et al. |
| 6,519,458 | B2 | 2/2003 | Oh et al. |
| 6,529,737 | B1 | 3/2003 | Skinner et al. |
| 6,633,846 | B1 | 10/2003 | Bennett et al. |
| 6,650,735 | B2 | 11/2003 | Burton et al. |
| 6,658,389 | B1 | 12/2003 | Alpdemir |
| 6,701,315 | B1 * | 3/2004 | Austin ................................. 1/1 |
| 6,738,740 | B1 | 5/2004 | Barash |
| 6,779,020 | B1 * | 8/2004 | Henrick ........................ 709/206 |
| 6,961,410 | B1 | 11/2005 | Castagna |
| 7,570,746 | B2 | 8/2009 | Takeda et al. |
| 2001/0049601 | A1 | 12/2001 | Kroeker et al. |
| 2002/0172331 | A1 | 11/2002 | Barker |
| 2002/0172339 | A1 | 11/2002 | Creswell et al. |
| 2002/0184024 | A1 | 12/2002 | Rorex |
| 2003/0050778 | A1 | 3/2003 | Nguyen et al. |
| 2003/0083556 | A1 | 5/2003 | Cosentino et al. |
| 2003/0156689 | A1 | 8/2003 | Ando et al. |
| 2003/0163316 | A1 | 8/2003 | Addison et al. |
| 2004/0010409 | A1 | 1/2004 | Ushida et al. |
| 2004/0019487 | A1 | 1/2004 | Kleindienst et al. |
| 2004/0054539 | A1 | 3/2004 | Simpson |
| 2004/0086095 | A1 | 5/2004 | Dixit et al. |
| 2005/0170869 | A1 | 8/2005 | Slemmer et al. |

FOREIGN PATENT DOCUMENTS

| | | |
|---|---|---|
| EP | 2410722 | 1/2012 |
| WO | 2005089485 | 9/2005 |

OTHER PUBLICATIONS

Advisory Action from U.S. Appl. No. 12/491,789 mailed Feb. 3, 2012.
Final Office Action for U.S. Appl. No. 12/491,789 mailed Jan. 24, 2011.
Final Office Action for U.S. Appl. No. 12/491,789 mailed Dec. 12, 2011.
Non Final Office Action for U.S. Appl. No. 12/491,789 mailed Sep. 1, 2011.
Non-Final Office Action from U.S. Appl. No. 12/491,789 mailed Aug. 19, 2010.
Notice of Allowance from U.S. Appl. No. 12/491,789 mailed Aug. 30, 2012.
Notice of Allowance from U.S. Appl. No. 12/491,789 mailed Jul. 12, 2012.
International Search Report and Written Opinion, PCT Nov. 16, 2005.
Kyoko, Takeda, U.S. Appl. No. 12/491,789, Itself.
Second Office Action from the Chinese Patent Office for App. No. 2005800086016 issued Jan. 29, 2010 (81294CN).
International Search Report and Written Opinion of the International Searching Authority for PCTUS2005009125 mailed Nov. 16, 2005 (81294PCT).
Office Action (Advisory Action) from U.S. Appl. No. 10/916,745 dated Oct. 30, 2007.
Office Action from U.S. Appl. No. 10/916,745 dated Nov. 16, 2007.
Office Action from U.S. Appl. No. 10/916,745 dated May 9, 2008.
Examiner Interview Summary for U.S. Appl. No. 10/916,745 mailed Dec. 15, 2008.
Final Office Action for U.S. Appl. No. 10/916,745 mailed Dec. 12, 2008.
Notice of Allowance from U.S. Appl. No. 10/916,745 mailed Apr. 3, 2009.
PCT International Preliminary Examination Report, PCT/US05/09125; mailed Sep. 27, 2006.
Third Office Action from the State Intellectual Property Office of the People's Republic of China for App. No. 2005800086016 issued Jul. 9, 2010.
Decision on Rejection from the State Intellectual Property Office of the People's Republic of China for App. No. 2005800086016 dated Jun. 22, 2011.
Non Final Rejection from the Korean Intellectual Property Office for KR App. No. 1020067021051 dated Sep. 28, 2011.
Office Action from the European Patent Office for European App. No. 057309056 dated May 26, 2011.
Extended European Search Report from the European Patent Office for Application No. 11182734.1 mailed Dec. 22, 2011.
Chinese Patent Office First Office Action from App. No. 2005800086016 issued Jul. 10, 2009.

* cited by examiner

METHOD AND APPARATUS FOR VOICE INTERACTIVE MESSAGING

This application is a continuation of application Ser. No. 12/491,789 filed Jun. 25, 2009, entitled METHOD AND APPARATUS FOR INTERACTIVE VOICE MESSAGING, to Takeda et al., which is a continuation of 10/916,745, filed Aug. 11, 2004, entitled METHOD AND APPARATUS FOR INTERACTIVE VOICE MESSAGING, to Takeda et al., which itself claims the benefit of U.S. Provisional Patent Application No. 60/554,755, filed Mar. 18, 2004, entitled VOICE INTERACTIVE MESSAGING, to Takeda et al., all of which applications are fully incorporated herein by reference in their entireties.

BACKGROUND OF THE INVENTION

The present invention relates to composing messages. More specifically, the present invention relates to interactive voice messaging for composing messages.

In order to send a message via a mobile phone, a user most often will need to read a small screen, type on a generally awkward and small keypad, use a cryptic handwriting language, correct handwriting translation errors, and select one or more hard/soft buttons on the mobile phone. In general the process of sending a message via a mobile phone requires different user interaction techniques to accomplish a single message sending task.

Thus, a system and method for conveniently creating and sending messages is needed.

SUMMARY OF THE INVENTION

The different embodiments described herein address the above mentioned needs as well as other needs by providing a method and apparatus for voice interactive messaging.

One embodiment can be characterized as a method comprising receiving a request to compose a message; outputting a first prompt requesting a recipient for the message; receiving a first audible response to the first prompt, the first audible response including a recipient of the message; outputting a second prompt requesting a body for the message; receiving a second audible response to the second prompt, the second audible response including a body of the message; and composing the message.

Another embodiment is characterized as an electronic device for voice messaging comprising an audible guide module for audibly prompting a user for recipient information and for audibly prompting a user for message information; a voice recognition module for interpreting received responses to the audible prompt for the recipient information and the audible prompt for the message information; and a message compiler module for creating a message from the responses to the audible prompt for the recipient information and the audible prompt for the message information.

A subsequent embodiment includes an electronic device comprising means for receiving a request to compose a message; means for outputting a first prompt requesting a recipient for the message; means for receiving a first audible response to the first prompt, the first audible response including a recipient of the message; means for outputting a second prompt requesting a body for the message; means for receiving a second audible response to the second prompt, the second audible response including a body of the message; and means for composing the message.

Still another embodiment is characterized as an electronic device for voice messaging comprising an audible guide module for audibly prompting a user for message information; a voice recognition module for interpreting received responses to the audible prompt for the message information; and a message compiler module for creating a message from the response the audible prompt for the message information.

BRIEF DESCRIPTION OF THE DRAWINGS

The above and other aspects, features and advantages of the present invention will be more apparent from the following more particular description thereof, presented in conjunction with the following drawings, wherein.

Figure 1:
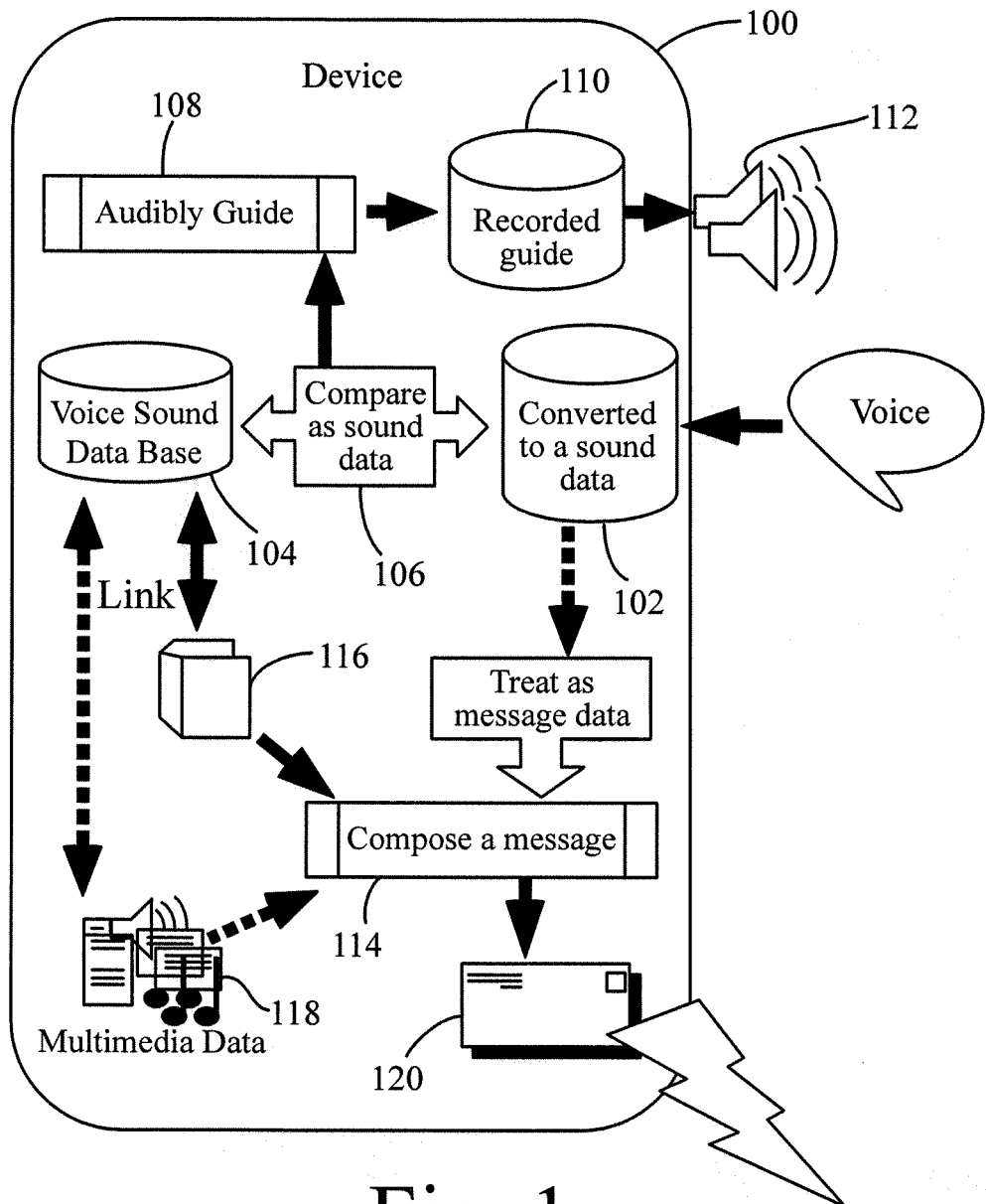
FIG. 1 is a block diagram illustrating a voice messaging system in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in the limiting sense, but is made merely for the purpose of describing the general principles of the invention. The scope of the invention should be determined with reference to the claims.

Referring to FIG. 1 a block diagram is shown illustrating a voice messaging system in accordance with one embodiment. Shown is an electronic device 100, a sound recorder 102, a sound database 104, a comparing module 106, an audible guide module 108, a recorded guide module 110, a speaker 112, a message composer 114, a contact database 116, a multimedia database 118, and a message 120.

The electronic device 100 includes the sound recorder 102, the sound database 104, the comparing module 106, the audible guide module 108, the recorded guide database 110, the speaker 112, the message composer 114, the contact database 116, and the multimedia database 118. The sound recorder 102, the sound database 104, the comparing module 106, the audible guide module 108, the recorded guide database 110, the message composer 114, the contact database 116, and the multimedia database 118 are implemented, in one embodiment, using a processor and one or more memory devices. The processor controls the operation of the electronic device and controls the access and the operation of the one or more memory devices.

The electronic device 100 is configured to compose and send messages of different types (e.g., voicemail, email and instant messaging) in response to a user audibly interacting with the electronic device 100. Preferably, the electronic device 100 audibly prompts the user for components or pieces of the message in order to compose the message.

In operation, the sound recorder 102 receives a voice input and converts the voice input into sound data. The comparing module 106 compares the sound data to data stored in the sound database 104. The sound database 104 stores previously recorded words and phrases for a user. In this manner, the electronic device 100 is trained by the user to recognize the user's voice patterns. This is known as speaker dependent voice recognition. In order to populate the sound database 104, the user optionally will go through a training process where commands are spoken by the user and recorded into the sound database 104.

Upon finding a match between the sound data and data stored in the sound database 104, information indicating a match is sent to the audible guide module 108. The audible guide module 108 analyzes the information sent from the comparing module 106 and determines the next piece of information needed from the user to compose a message. The audible guide module 108 then sends a signal to the recorded guide module 110. The recorded guide module 110 outputs a request for information through the speaker 112. The output, in one embodiment, is a request for a recipient of a message. The electronic device 100 then waits for a response from the user.

The sound recorder 102 next records the response from the user as sound data. The comparing module 106 compares the recorded sound data to information in the sound database 104. The recorded sound data is information that will be used to compose a message, for example, a recipient, a subject, a body, a message type, or an attachment. The electronic device treats the response as corresponding to the information requested in the previous prompt for information. For example, if the previous request was "Who would you like to send a message to?" then the recorded sound data is treated as recipient information and used to gather information from the contact database 116. Similarly, if the previous request was "What file would you like to attach to the message?" then the recorded sound data is used to attach a file from the multimedia database 118. In another example, if the previous request was "Please state your message?" the recorded sound data is used to compose the body of the message 120. This will be further described and illustrated herein with reference to FIG. 3.

The body of the message can be delivered to the recipient in a number of different ways. For example, in one embodiment, the body of the message is stored as a sound file and sent as an attachment in an email. Alternatively, the body of the message is converted into text and sent to the recipient, for example, as an instant message or an email. The message composer 114 utilizes all of the responses to the requests for information in order to assemble the final message. The message is then sent to the user utilizing, for example, a cellular telephone system and a cellular network. In a preferred embodiment the electronic device is a cellular telephone, however, the electronic device is for example, a desktop computer, a laptop computer, a PDA, and a tablet PC in alternative embodiments.

Figure 2:
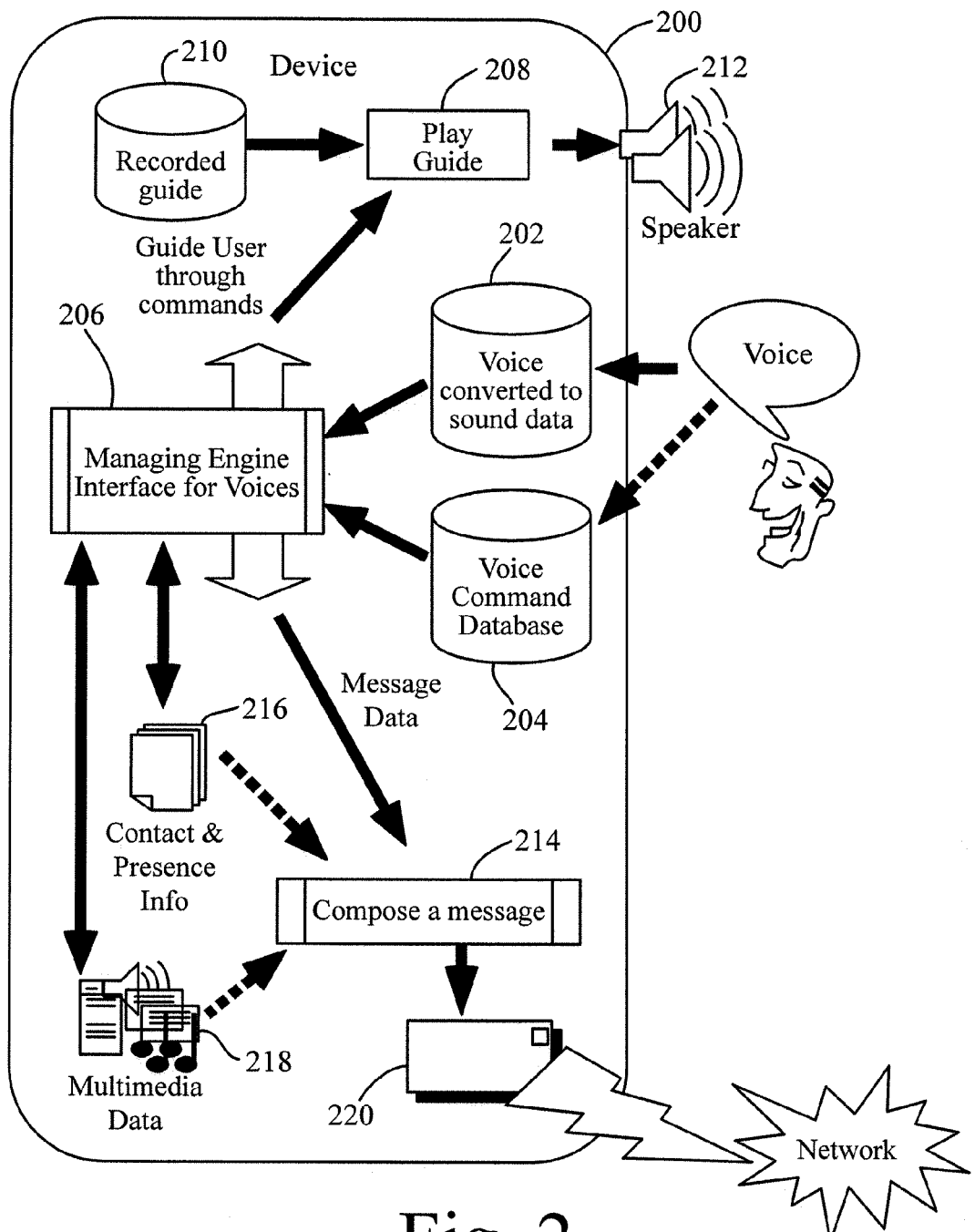
FIG. 2 is a block diagram illustrating a voice messaging system in accordance with an alternative embodiment.

Referring to FIG. 2 is a block diagram illustrating a voice messaging system in accordance with an alternative embodiment. Shown is an electronic device 200, a sound recorder 202, a sound database 204, a messaging engine and voice interface module 206, an audible guide module 208, a recorded guide module 210, a speaker 212, a message composer 214, a contact database 216, a multimedia database 218, and a message 220.

The electronic device 200 is configured to compose and send messages of different types (e.g., voicemail, email and instant messaging) in response to a user audibly interacting with the electronic device 200. Preferably, the electronic device 200 audibly prompts the user for components or pieces of the message in order to compose the message.

In operation, the sound recorder 202 receives a voice input and converts the voice input into sound data. The messaging engine and voice interface module 206 interprets the sound data and determines what action to take based upon the analysis of the sound data. The sound database 204 stores information needed for a speaker independent voice recognition system. In this manner, the device does not need to be trained by the user to recognize the user's voice patterns as the device has the capability to recognize any voice input through analysis of the sound data. This is known as speaker independent voice recognition.

After analyzing the sound data and data stored in the sound database 204, the messaging engine and voice interface module 206 determines how the electronic device 200 should respond to the user input. For example, if the user would like to send a message, the messaging engine and voice interface module 206 directs the audible guide module 208 to request additional information from the user. The audible guide module 208 then retrieves a request from the recorded guide database 210 and the request is then output through the speaker 212. The output, in one embodiment is a request for a recipient of a message. The electronic device 200 then waits for a response from the user. The sound recorder 202 next records the response from the user as sound data. The messaging engine and voice interface module 206 use the recorded sound data and determine a recipient for the message. The recipient for the message will be used by the message composer 214 to create a message.

The electronic device 200 continues to output audible requests for all of the data needed to compose a message and records the replies from a user as sound data. The recorded sound data is information that will be used to compose a message, for example, a recipient, a subject, a body, a message type, or a filename of an attachment. The electronic device treats the response as corresponding to the information requested in the previous prompt for information. For example, if the previous request was "Who would you like to send a message to?" then the recorded sound data is treated as recipient information. Similarly, if the previous request was "What file would you like to attach to the message?" then the recorded sound data used to determine an appropriate file to attach. In another example, if the previous request was "Please state the body of your message?" the recorded sound data is treated as the body of the message.

Figure 3A:
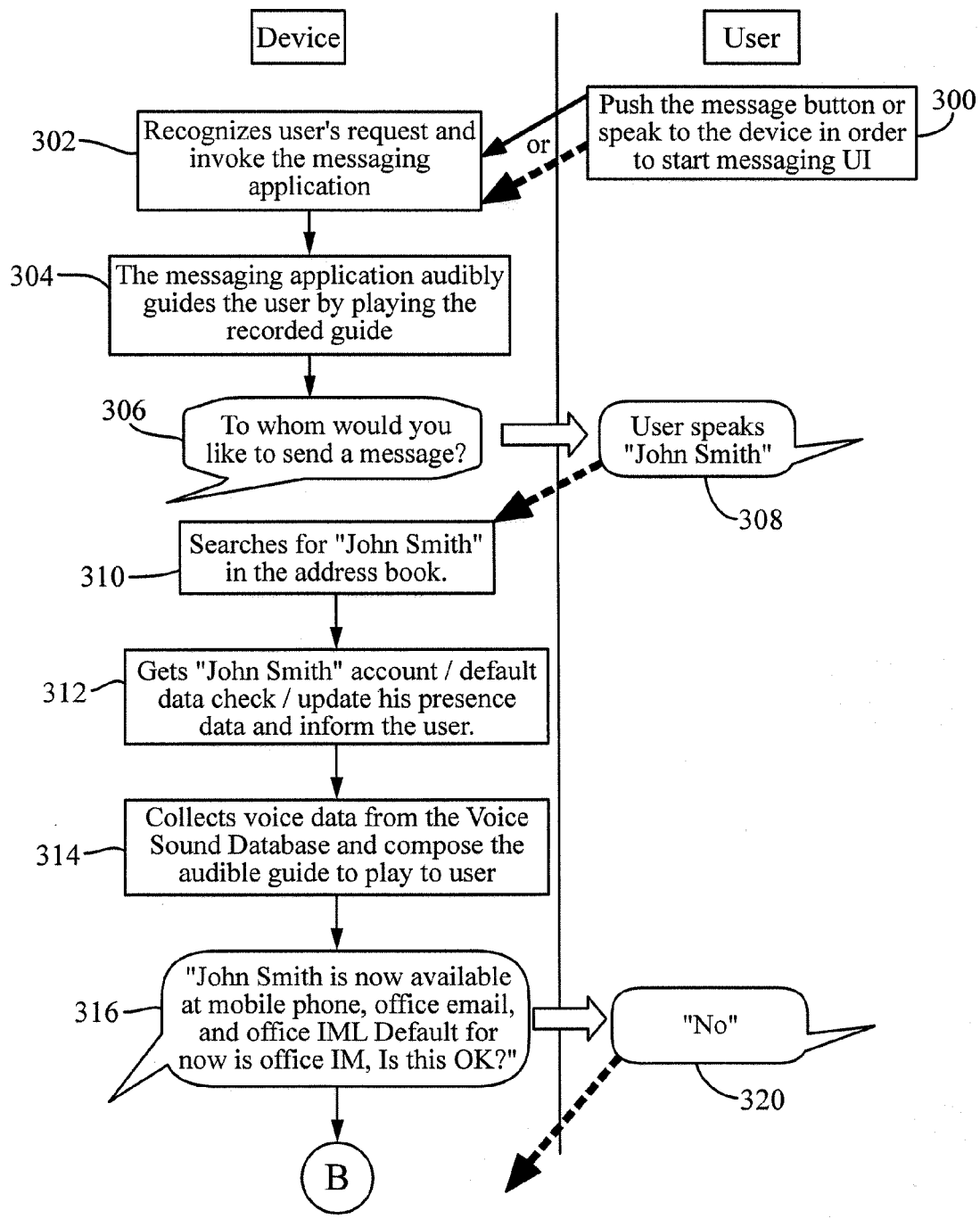
FIGS. 3A-3C are a flow diagram illustrating a method of voice messaging in accordance with one embodiment.
Figure 3B:
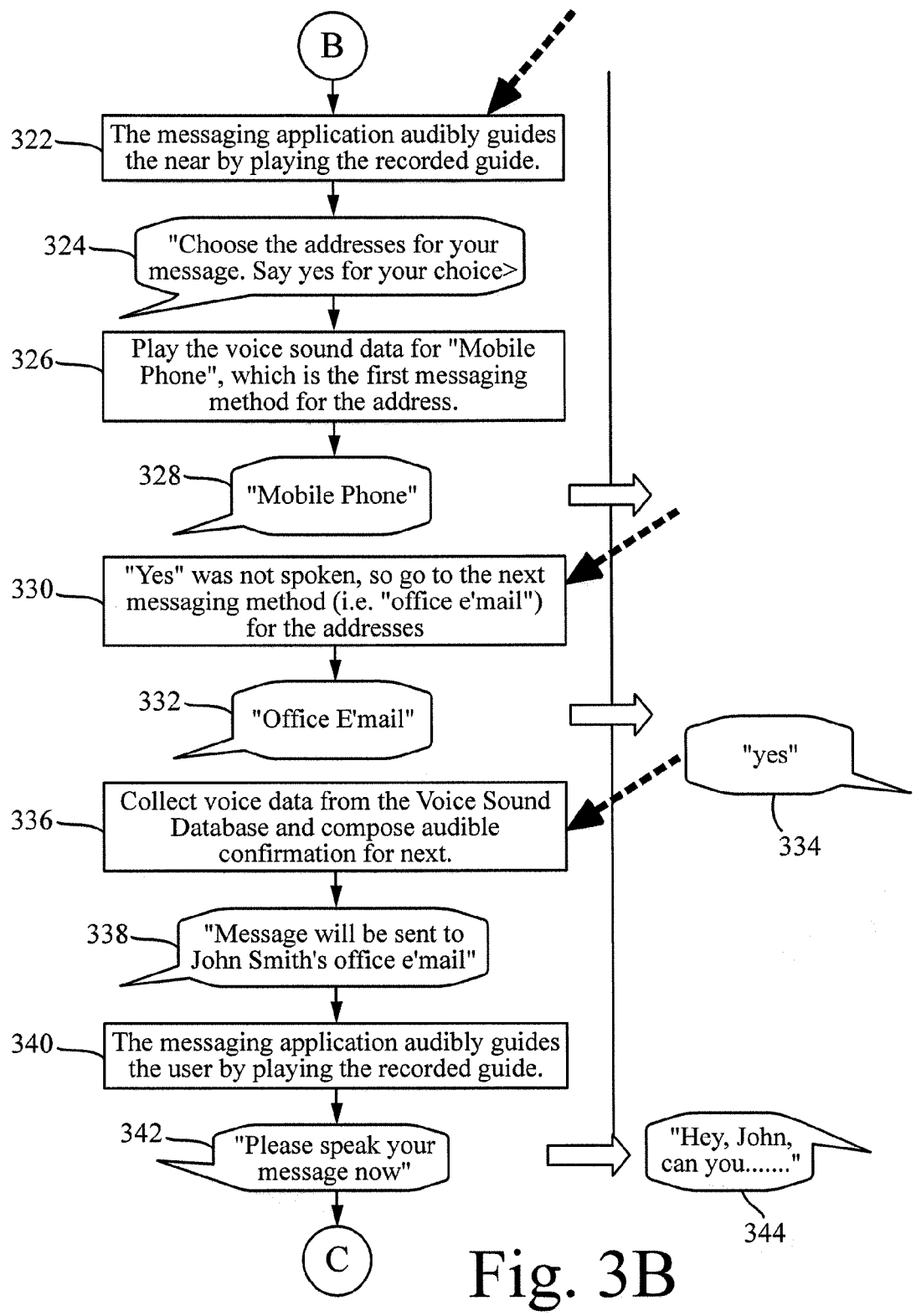
Figure 3C:
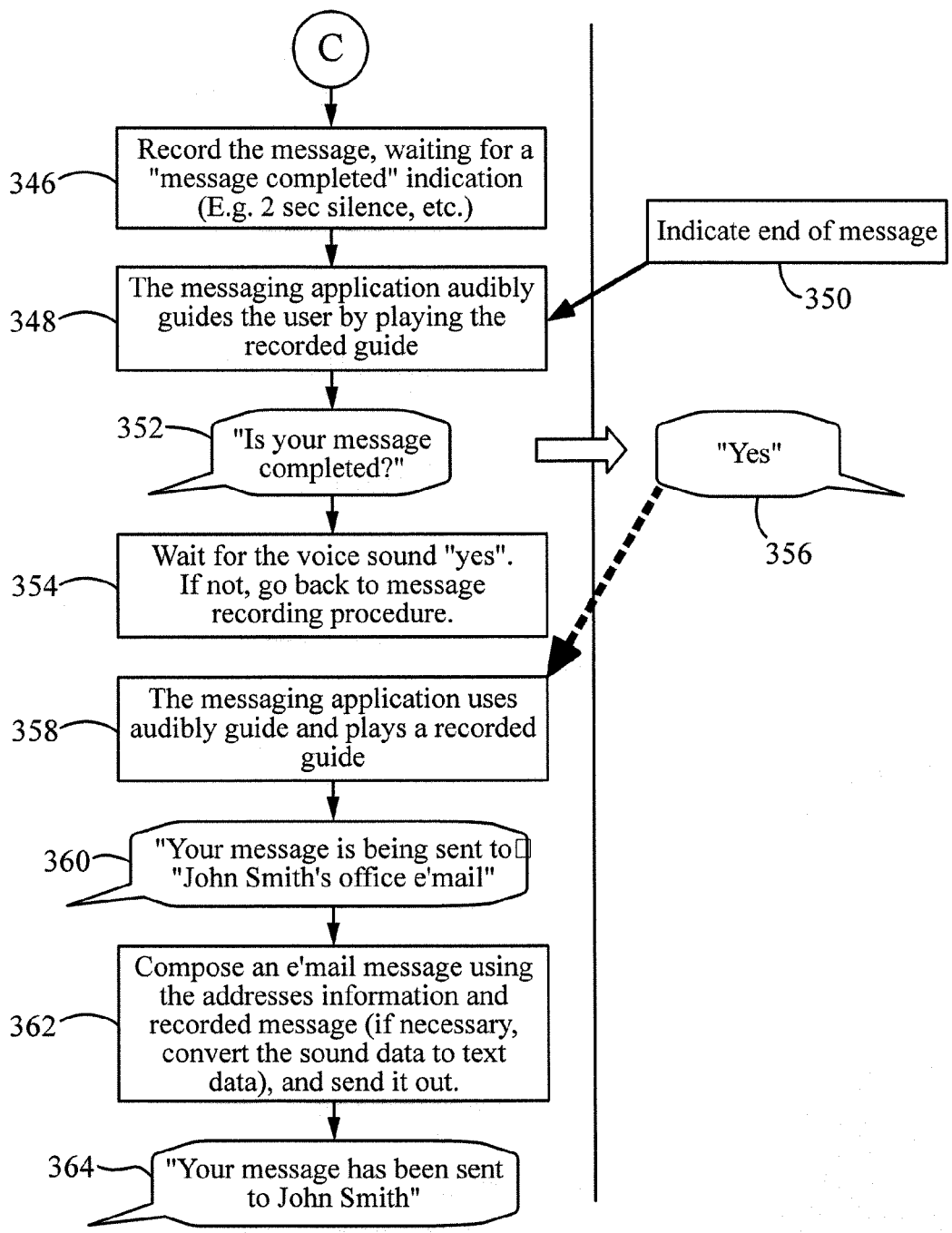

Referring next to FIGS. 3A-C a flow diagram is shown illustrating a method of voice messaging. In the illustrative embodiment, the method is performed through interaction with an electronic device. For example, the electronic device is in alternative embodiments, a cellular telephone, a personal digital assistant, a desktop computer, a laptop computer, or a tablet personal computer (PC).

In step 300, a user interacts with an electronic device in order to invoke a messaging application. For example, the user issues a voice command or presses a button (soft or hard key) of the electronic device. In step 302, the electronic device recognizes the user's request and invokes a messaging application. The electronic device next proceeds to audibly guide the user through a message creation session in step 304.

In step 306, the electronic device requests a recipient of the message. For example, the device will audibly output "To who would you like to send a message?" through, for example, a speaker on the electronic device. The electronic device then awaits a response (e.g., John Smith) from the user. In step 308, the user speaks the recipients name (e.g. John Smith) which the electronic device receives and records. In step 310, the electronic device searches an address book for the recorded response. For example, the electronic device searches for "John Smith" in the address book. Continuing the example of "John Smith" being the recipient, in step 312, the electronic device gathers information for John Smith's account and determines the next type of information needed to compose a message. For example, the electronic device determines the types of messages that John Smith can receive and also optionally determines which devices John Smith currently has access to or prefers to be contacted at.

The electronic device then, in step 314, collects voice data from the sound database and composes an audible prompt. For example, "John Smith is now available at mobile phone, office email and instant messenger (IM). The default message is IM. Is this okay?" The electronic device then awaits a response from the user. In an alternative embodiment, the electronic device simply chooses a type of message to be sent based upon, for example, the preferred message type of the recipient. This feature will be described herein below in greater detail with reference to FIG. 4. In step 320, the user responds, for example, "Yes" or "No" and the electronic device records and processes the response. In the example shown the user responds by saying "No." Next, in step 322, the electronic device audibly guides the user for a desired message type. In step 324, the electronic device directs the user interaction by outputting the audible prompt "choose the addressee for your message. Say Yes for your choice." In step 326, the electronic device identifies a first messaging method for the recipient of the message and in step 328 outputs the audible prompt "Mobile Phone." The electronic device, in step 330, determines that "yes" was not spoken by the user and proceeds to identify a second messaging method for the recipient. Following, in step 332, outputs audible prompt "Office Email" and waits for a response. In step 334, the user speaks "Yes" and the electronic device, in step 336, records the user response, stores the response as sound data, and composes an audible confirmation for the user. In step 338 the electronic device audibly outputs "message will be sent to John Smith's office email."

In step 340, the electronic device audibly guides the user by prompting the user for a body of the message and in step 342 outputs an audible prompt requesting a body of the message that states "please speak your message now."

In step 344, the user speaks the body of the message. The electronic device then awaits a response from the user and records the response. In step 346, the device records the message and waits for an indication that the body of the message is complete (e.g., two seconds of silence indicates the end of the message in step 350). The electronic device, in steps 348 and 350, then audibly confirms that the message is complete by outputting "Is your message completed?" from the speaker. In step 356, upon receiving a user response of "Yes" the electronic device outputs an audible confirmation that the message is being sent in step 358. For example, in step 360, the electronic device outputs "Your message is being sent to John Smith's office e-mail" to confirm that all of the information needed to send the message has been received.

In step 354, if the message was not completed, the electronic device will resume recording the message. Next in Step 362, the electronic device composes the message using the recipient, type of message and body of the message gathered from the user. In one embodiment, the body of the message (i.e., the recorded sound data) is converted into text, while in another embodiment, the response is sent to the recipient as an audio file or audible message. For example, an email message can include the body with a text message or the email could include an audio file as an attachment. Lastly, in step 364, the electronic device audibly output "Your message has been sent to John Smith" to confirm the message was sent to the recipient. Each time the user speaks a response the electronic device processes the response according to whether the electronic device is a speaker independent or speaker dependent voice recognition system. For example, in a speaker dependent system, the sound data from the user's response is compared to a database containing pre-recorded words and phrases spoken by the user.

Figure 4:
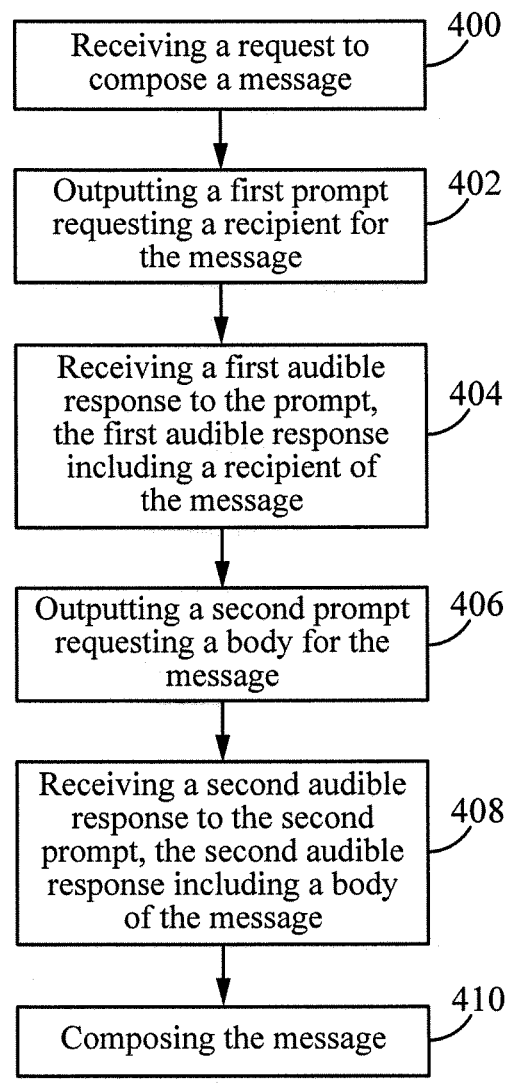
FIG. 4 is a flow diagram illustrating a method of voice messaging in accordance with another embodiment.

Referring to FIG. 4, a flow diagram is shown illustrating a method of voice messaging in accordance with one embodiment.

First in step 400, an electronic device receives a request to compose a message. For example, a user selects a messaging function on the electronic device through a menu option or a messaging button. Alternatively, a user can audibly request to send a message. The electronic device employs either a speaker dependent or speaker independent voice recognition system. For a speaker dependent system, the electronic device will compare the audible request to send a message (converted to sound data) to a database of prerecorded words or phrases in order to recognize the request. For a speaker independent voice recognition system, the system will recognize what the user says and proceed without the need to store pre-record user-specific phrases into the database.

Next in step 402, the electronic device outputs a first prompt requesting a recipient for the message. In a preferred embodiment, the electronic device outputs an audible prompt that requests the recipient of the message. Alternatively, the device can output the request for the recipient by placing the prompt on a display screen of the electronic device.

Next in step 404, the electronic device receives a first audible response to the first prompt, the first audible response including a recipient of the message. For example, the electronic device receives the name "John Smith" that was spoken by the user at a microphone and records the response as sound data.

Next in step 406, the electronic device outputs a second prompt requesting a body for the message. In a preferred embodiment, the electronic device outputs an audible prompt that requests the body of the message. Alternatively, the device can output the request for the body of the message by placing the prompt on a screen of the electronic device.

In step 408, the electronic device receives a second audible response to the second prompt, the second audible response including a body of the message.

Following, in step 410, the electronic device composes the message. For example, the message is composed for the intended recipient including the body of the message. In one example, an email is created and sent to the recipients email address. The email can contain an attachment that includes sound data of the message body or the email can include a text portion that has been created by the electronic device by converting the sound data into text. Alternatively, the electronic device can leave a voice mail for the recipient or send the recipient an instant message.

In an optional step, the electronic device outputs a prompt requesting a message type for the message. For example, the device can prompt the user as to whether to send a voice message or and email. The electronic device then receives an audible response including a type of message to be sent. In an alternative embodiment, the electronic device determines what type of message to send based upon a current status of the recipient or a preferred contact mode for the recipient. One method and system for identifying a current status of a recipient, or what type of message they would currently prefer to receive is described in U.S. patent application Ser. No. 10/872,993, filed Feb. 2, 2004 entitled "AUTOMATIC USER DEVICE PRESENCE REGISTRATION SYSTEM," which is fully incorporated herein by reference. Therefore, in one embodiment, the electronic device automatically determines what type of message will be sent to the recipient and does not need to prompt the user for the type of message to send.

When the electronic device automatically determines what type of message to send to the recipient, the electronic device will also automatically determine the best form for the body of the message. For example, in an email message, the body could be converted to text if the recipient is at a work computer. However, if the recipient is only available on their PDA, the body could be an audio file attachment the user can listen to, as reading the text may be more difficult on the small screen of a PDA.

In another aspect of the present invention, the electronic device can be used to update the user's availability and preferred contact type. Preferably, the user can audibly interact with the electronic device in order to update their availability and preferred contact type. As described before, a system for AUTOMATIC USER DEVICE PRESENCE REGISTRATION is described in U.S. application Ser. No. 10/872,993.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method for sending messages to a recipient, the method comprising,
   receiving an audio indication of a message recipient from a user who desires that a message be sent to the message recipient;
   analyzing the audio indication to determine the recipient and searching an electronic database for an electronic account of the recipient;
   retrieving information from the electronic account, the retrieved information indicating one or more modes of message delivery to the recipient;
   analyzing a content of the account to identify a next piece of information;
   constructing an audio guide for the user based upon the retrieved information, the audio guide including one or more audio prompts, the prompts being entirely customizable and not based upon a predetermined pattern wherein, an informational content of the prompts, a sequence of the prompts, and a format of the prompts being changeable between users;
   sequentially prompting the user with the audio prompts to select at least one of the modes of message delivery and to obtain the next piece of that is needed to construct the message;
   constructing and sending the message to the recipient according to the selected mode of message delivery.

2. The method of claim 1 wherein the electronic database comprises an electronic address book.

3. The method of claim 1 wherein the message is a recorded voice message.

4. The method of claim 1 wherein the one or more modes of message delivery is a delivery mode selected from the group consisting of email and a phone.

5. The method of claim 1 wherein the analyzing comprises using an independent voice recognition system to determine the recipient.

6. The method of claim 1 wherein constructing the message comprises obtaining a message content from the user.

7. A apparatus, the apparatus comprising,
   an interface having an input and output, the interface configured to receive at the input an audio indication of a message recipient from a user who desires that a message be sent to the message recipient;
   a controller, the controller being coupled to the interface, the controller configured to analyze the audio indication to determine the recipient and search an electronic database for an electronic account of the recipient, the controller further configured to retrieve information from the electronic account, the retrieved information indicating at one or more modes of message delivery to the recipient, the controller configured to analyze a content of the account to identify a next piece of information, the controller further configured to construct an audio guide for the user based upon the retrieved information, the audio guide including one or more audio prompts, the prompts being entirely customizable and not based upon a predetermined pattern wherein, an informational content of the prompts, a sequence of the prompts, and a format of the prompts being changeable between users, the controller further configured to sequentially prompt the user at the output with the audio prompts to select at least one of the modes of message delivery and to obtain the next piece of that is needed to construct the message, the controller configured to construct and send the message to the recipient according to the selected mode of message delivery.

8. The apparatus of claim 7 wherein the electronic database comprises an electronic address book.

9. The apparatus of claim 7 wherein the message is a recorded voice message.

10. The apparatus of claim 7 wherein the one or more modes of message delivery is a delivery mode selected from the group consisting of email and a phone.

11. The apparatus of claim 7 wherein the controller analyzes the audio indicator using an independent voice recognition system to determine the recipient.

12. The apparatus of claim 7 wherein the controller constructs the message with a message content obtained from the user at the input.

* * * * *

UNITED STATES PATENT AND TRADEMARK OFFICE
CERTIFICATE OF CORRECTION

| | |
|---|---|
| PATENT NO. | : 8,755,494 B2 |
| APPLICATION NO. | : 13/711247 |
| DATED | : June 17, 2014 |
| INVENTOR(S) | : Takeda et al. |

It is certified that error appears in the above-identified patent and that said Letters Patent is hereby corrected as shown below:

In the Claims:

Claim 1, column 7, lines 56-57, delete "pattern wherein," and insert --pattern, wherein--.

Claim 7, column 8, line 35, delete "pattern wherein," and insert --pattern, wherein--.

Signed and Sealed this
Fourth Day of November, 2014

Michelle K. Lee
*Deputy Director of the United States Patent and Trademark Office*